United States Patent Office 3,359,681
Patented Dec. 26, 1967

3,359,681
COMPOSITION AND METHOD FOR STIMULATING
FLOW OF PINE GUM
Ralph W. Clements, Lake City, Fla., assignor to the United
States of America as represented by the Secretary of
Agriculture
No Drawing. Filed Aug. 9, 1966, Ser. No. 571,181
5 Claims. (Cl. 47—10)

A non-exclusive, irrevocable, royalty-free license in the invention herein described, throughout the world for all purposes of the United States Government, with the power to grant sublicenses for such purposes, is hereby granted to the Government of the United States of America.

This invention relates to a method of preparing a chemical composition in the form of a semi-viscid paste, to the composition itself, and to a method of utilizing the composition for stimulating and prolonging the flow of oleoresins and gums from a living coniferous tree, such as a pine tree, by applying the composition to prepared wounds in the trunk of the tree.

The invention has among its objects the provision of such a composition and its use on a coniferous tree so as to cause the tree to exude gum for greatly extended intervals of time and to substantially reduce the required number of visits to the tree for the purpose of wounding and applying the composition. Other objects will be apparent from the description of the invention.

In general, the composition of the invention is in the form of a semi-viscid paste and comprises:

(a) A nonphytotoxic mineral oil containing a surface active material (surfactant), such as Triton X–207, which imparts adhesive as well as lubricative properties to the end product, such a surfactant-containing mineral oil being exemplified by the commercially available "Sunoco Spray 7–E";

(b) An ammonium chloride emulsifier which is a fat-derived, cationic, surface-acting agent, and which chemically, is the quaternary ammonium salt known as Dicoco dimethyl ammonium chloride, such ammonium chloride emulsifier being exemplified by the commercially available "Arquad 2C–75";

(c) A plasmolytic agent which is a strong electrolyte and serves as the activating agent for prolonging gum flow, such plasmolytic agent being exemplified by a 60%, by weight, aqueous solution of sulfuric acid. Other plasmolytic agents which can be employed are plant growth regulators such as 2,4-dichlorophenoxyacetic acid and 2,4,5-trichlorophenoxyacetic acid.

(d) A silica gel for use as a stiffener to lend body to the liquid components, above, and to reduce the amount of kaolin (described in (e) below) required for proper texture, such a silica gel being exemplified by the commercially available "Cab-o-sil" which is a submicroscopic pyrogenic silica prepared in a hot gaseous environment (about 1100° C.) to produce a purity of 99.0% in the product; and (e) Kaolin, a water-washed, apron-dried pulverized clay which is not calcined, in which 80 to 82% of the particles are less than 2 microns in size with a 325 mesh residue of 0.01%, and which chemical analysis shows to contain about 38.38% aluminum oxide and 45.30% silicon dioxide, the kaolin serving as an inert carrier and to supplement the bulk weight of the end product (the paste), the texture of the paste being governed largely by the amount of kaolin used and the rate of agitation in the final stage of its formation. An example of the kaolin used is the commercially available product known as "KCS Clay."

A specific formulation of the preferred ingredients of the inventive composition, including the preferred proportions thereof, is the following:

Nonphytotoxic mineral oil (Sunoco Spray 7–E)
ml__ 90
Ammonium chloride emulsifier (Arquad 2C–75)
ml__ 25
Sulfuric acid (CP grade) (60% aqueous solution)
ml__ 4000
Silica gel (Cab-o-sil) _____gm__ 1000
Kaolin (KCS Clay) _____gm__ 1200

The inventive method of combining the ingredients of the above formulation to produce a stimulative paste in which the electrolyte is the external phase of the system encased by the nonphytotoxic mineral oil, which paste forms the inventive composition, comprises the following essential steps in sequence and in which, all the liquid components and the room temperature are maintained at a constant 70° F.;

(a) Mixing the emulsifier with the surfactant-containing mineral oil which is agitated at about 500 r.p.m. to form an oil emulsion;

(b) Agitating the sulfuric acid at about 750 r.p.m. and slowly adding thereto the formed oil emulsion;

(c) Increasing the agitation of the resulting mixture to about 900 r.p.m. and adding thereto the silica gel in batches of 25 grams until the silica gel is completely dissolved;

(d) Adding 600 grams of the kaolin to the resultant admixture and increasing the agitation thereof to about 1725 r.p.m.;

(e) Adding the remaining quantity of the kaolin (600 grams) to the admixture; and (f) Continuing the agitation of the resulting mixture until it fluffs.

The resulting composition is a semi-viscid paste which is admirably suited for use on wounded conifers to stimulate and prolong the flow of oleoresins and gums. In this respect, the paste composition provides (a) adhesive and retentive qualities for extended efficacious potency, (b) the proper viscosity for applicative purposes by hand-squeeze pressure, (c) stability of the system for preventing separating of the components, and (d) the proper texture for manageability.

The following examples illustrate the use of the paste produced from the afore-described formulation:

*Example 1*

Wounds or "streaks" of the size and shape used in commercial naval store operations were cut on 25 trees each of both slash and longleaf pines using a bark-chipping tool or "hack." This tool removes only the bark and phloem exposing the outer xylem (wood) of the tree. Immediately thereafter a 3/16 inch bead of the afore-described paste was applied precisely in the groove formed by juncture of wood and bark. These cuts and treatments were repeated at regular 21-day (triweekly) intervals for 33 weeks each calendar year over a 2-year period. Gum was collected and weighed at the end of each 21-day interval. A total of 11 treated streaks were applied each year. Yields were compared with a control employing streaks cut at 14-day (biweekly) intervals and treated with a 50-percent aqueous solution of sulfuric acid (currently standard treatment in the naval stores industry). The data and results are presented in the accompanying table.

As is apparent from the table, the yields (98%) from 22 paste-treated streaks were substantially equal to the yields (100%) from 32 control streaks, with more than a 30% saving in labor.

*Example 2*

A procedure, similar to that in Example 1, above, was applied on 25 trees each of both slash and longleaf pine in which streaks were cut and treated with the paste at 28-day (monthly) intervals, 8 each calendar year and 16 for the 2-year period. The data and results are also included in the accompanying table.

As is apparent from the table, the amazing potential of the paste method is reflected in the fact that 8 streaks each year produced 88% of the yield normally obtained from twice as many streaks affording a 50% saving in labor. This is important since the major need of the industry is not to produce more gum, but rather, to reduce labor requirements and costs.

SLASH PINE

| Chipping interval and stimulant | Streaks per year | Total yield for 2 years, bbls./crop | Comparative yield expressed as percent of control |
|---|---|---|---|
| Biweekly-control | 16 | 640 | 100 |
| Triweekly-paste | 11 | 626 | 98 |
| Monthly-paste | 8 | 560 | 88 |

LONGLEAF PINE

| | | | |
|---|---|---|---|
| Biweekly-control | 16 | 572 | 100 |
| Triweekly-paste | 11 | 579 | 101 |
| Monthly-paste | 8 | 501 | 88 |

The above examples demonstrate that the invention prolongs the flow of resin and preindicates a substantial reduction in the number of visits to the tree for the purpose of wounding and treating.

What is claimed is:

1. A method of preparing a composition in the form of a semi-viscid paste which is useful for stimulating and prolonging the flow of oleoresins and gums from living coniferous trees when applied to prepared wounds on the trunks thereof, said method comprising the following sequential steps in which all the liquid components and the room temperature are maintained at a constant 70° F.:
    (a) mixing an ammonium chloride emulsifier with a surfactant-containing nonphytotoxic mineral oil which is agitated at about 500 r.p.m. to form an oil emulsion;
    (b) agitating a 60%, by weight, aqueous solution of sulfuric acid at about 700 r.p.m. and slowly adding thereto the formed oil emulsion of step (a);
    (c) increasing the agitation of the resulting mixture of step (b) to about 900 r.p.m. and adding thereto silica gel in sufficient quantity and until completely dissolved to lend body to the afore-described liquid components and to reduce the amount of kaolin, described in steps (d) and (e) hereafter, required for control of proper texture of said paste;
    (d) adding a sufficient amount of kaolin to the resultant admixture of step (c) to serve as an inert carrier and to supplement the bulk weight of the said paste, and increasing the agitation of the resulting mixture to about 1725 r.p.m.;
    (e) adding an additional quantity of the kaolin to the resulting mixture of step (d) sufficient to provide the proper texture for the paste; and
    (f) continuing the agitation of the resulting admixture of step (e) until it fluffs to produce the paste.

2. A composition for stimulating and prolonging the flow of oleoresins and gums from living coniferous trees when applied to prepared wounds on the trunks thereof, comprising an intimate mixture of a surfactant-containing nonphytotoxic mineral oil, an ammonium chloride, emulsifier, a plasmolytic agent selected from the group consisting of (a) a 60%, by weight, aqueous solution of sulfuric acid, (b) 2,4-dichlorophenoxyacetic acid, and (c) 2,4,5-trichlorophenoxyacetic acid, silica gel, and kaolin.

3. The composition of claim 2 wherein the plasmolytic agent is a 60%, by weight, aqueous solution of sulfuric acid and the ingredients are present in the proportions of (a) 90 ml. of a surfactant-containing nonphytotoxic mineral oil, (b) 25 ml. of an ammonium chloride emulsifier, (c) 4000 ml. of the 60%, by weight, aqueous solution of sulfuric acid, (d) 1000 grams of silica gel, and (e) 1200 grams of kaolin.

4. A method of stimulating and prolonging the flow of oleoresins and gums from prepared wounds on the trunk of a living coniferous tree, comprising applying to said wounds a composition, in the form of a semi-viscid paste, comprising an intimate mixture of a surfactant-containing nonphytotoxic mineral oil, an ammonium chloride emulsifier, a plasmolytic agent selected from the group consisting of (a) a 60%, by weight, aqueous solution of sulfuric acid, (b) 2,4-dichlorophenoxyacetic acid, and (c) 2,4,5-trichlorophenoxyacetic acid, silica gel and kaolin.

5. The method of claim 4, wherein the plasmolytic agent is a 60%, by weight, aqueous solution of sulfuric acid and the ingredients are present in the proportions of (a) 90 ml. of a surfactant-containing nonphytotoxic mineral oil, (b) 25 ml. of an ammonium chloride emulsifier, (c) 4000 ml. of the 60%, by weight, aqueous solution of sulfuric acid, (d) 1000 grams of silica gel, and (e) 1200 grams of kaolin.

References Cited

FOREIGN PATENTS 116,047    2/1954    U.S.S.R.

OTHER REFERENCES

Sylwan, Edward Kaminski, 1958, vol. 102, No. 12, pp. 49–55.

ROBERT E. BAGWILL, *Primary Examiner.*